US011159338B1

(12) United States Patent
Roche et al.

(10) Patent No.: US 11,159,338 B1
(45) Date of Patent: Oct. 26, 2021

(54) DEVICE STATE INFORMATION ACCESS THROUGH MACHINE-READABLE LABELS

(71) Applicant: Amazon Technologies, Inc., Seattle, WA (US)

(72) Inventors: Kyle Michael Roche, Mercer Island, WA (US); David Craig Yanacek, Seattle, WA (US); James Christopher Sorenson, III, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 571 days.

(21) Appl. No.: 15/186,333

(22) Filed: Jun. 17, 2016

(51) Int. Cl.
*G06K 7/10* (2006.01)
*G06K 19/06* (2006.01)
*H04L 29/08* (2006.01)
*G06F 9/451* (2018.01)
*H04L 12/28* (2006.01)

(52) U.S. Cl.
CPC .......... *H04L 12/2816* (2013.01); *G06F 9/451* (2018.02); *G06K 7/10861* (2013.01); *G06K 19/0614* (2013.01); *G06K 19/06028* (2013.01); *G06K 19/06037* (2013.01); *G06K 19/06056* (2013.01); *H04L 67/10* (2013.01)

(58) Field of Classification Search
CPC ................ H04L 12/2816; H04L 67/10; G06K 19/06028; G06K 19/0614; G06K 19/06056; G06K 7/10861; G06K 19/06037; G06F 9/451
See application file for complete search history.

(56) References Cited

U.S. PATENT DOCUMENTS

| 2005/0038872 | A1* | 2/2005 | Ono | G06K 7/10722 709/218 |
| 2010/0327060 | A1* | 12/2010 | Moran | G06K 7/0004 235/440 |
| 2013/0026241 | A1* | 1/2013 | Sakahashi | G06K 19/06037 235/494 |
| 2014/0013407 | A1* | 1/2014 | Tilly | G07C 9/00103 726/6 |
| 2015/0019444 | A1* | 1/2015 | Purves | G06Q 20/382 705/76 |
| 2015/0302421 | A1* | 10/2015 | Caton | G06Q 30/018 705/17 |
| 2016/0104017 | A1* | 4/2016 | Deal | G06K 7/10821 235/462.07 |
| 2016/0277205 | A1* | 9/2016 | Liu | H04W 4/70 |
| 2017/0124442 | A1* | 5/2017 | Nishizaki | G06K 19/06037 |
| 2017/0344321 | A1* | 11/2017 | Li | G06F 3/12 |

* cited by examiner

*Primary Examiner* — Roberto Borja
(74) *Attorney, Agent, or Firm* — Davis Wright Tremaine LLP

(57) ABSTRACT

A controlling device scans a label of a network-connected device to obtain a first set of information from a primary layer of the label, where the first set of information is about the network-connected device. The controlling device scans the label to obtain a second set of information from a secondary layer of the label, whereby the secondary layer is distinct from the primary layer. The controlling device transmits a request to a device server associated with the network-connected device to obtain device records for the device, whereby the request includes the second set of information. In response to the request, the controlling device receives the one or more device records.

20 Claims, 9 Drawing Sheets

DEVICE STATE INFORMATION ACCESS THROUGH MACHINE-READABLE LABELS

BACKGROUND

Various mechanisms exist that enable network-connected devices to provide and receive device state information from a remote computing resource service. For instance, a network-connected device can transmit, through HyperText Transfer Protocol (HTTP) or MQ Telemetry Transport (MQTT), state information over time to a remote computing resource service, which may store the state information for the device in a device record. Users of the network-connected device can access the remote computing resource service to evaluate the device record and determine the state of a network-connected device. Further, these users can provide, through the remote computing resource service, device state information for a network-connected device. This may cause the network-connected device to receive state information from the remote computing resource service and to change its state accordingly. However, it may be difficult for a user to interact with a network-connected device and visualize changes to the device state.

BRIEF DESCRIPTION OF THE DRAWINGS

Various techniques will be described with reference to the drawings, in which.

DETAILED DESCRIPTION

Figure 1:
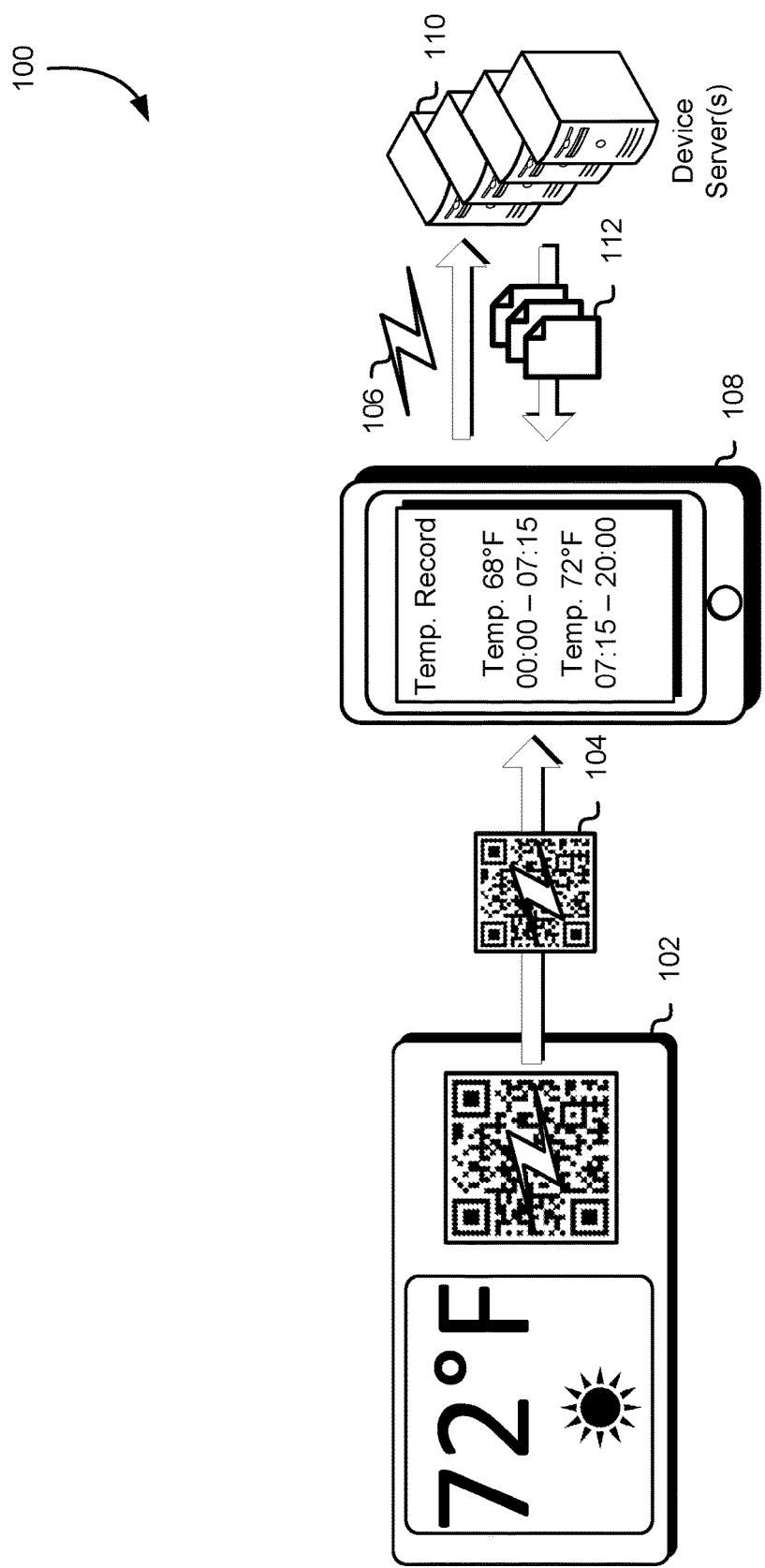
FIG. 1 shows an illustrative example of an environment in which a controlling device obtains one or more device records for a device from a device server identified through scanning of a code on the device in accordance with at least one embodiment.

This disclosure relates to the use of multiple-layer machine-readable labels, such as Quick Response (QR) codes, Universal Product codes (UPCs), and other barcodes, to enable users of a device to interact with network-connected devices. In one example, a network-connected device (e.g., Internet of Things (IoT) device, etc.) includes a machine-readable label that comprises at least two different layers: a primary layer and a secondary layer. The primary layer of the machine-readable label may include information concerning the network-connected device. This information may include the serial number of the device, the make and model of the device, the date of manufacture of the device, and the like. A user of the network-connected device may utilize a second device (e.g., smartphone, laptop, tablet computer, other computing devices, etc.) to scan the machine-readable label to obtain the information specified in the primary layer of the machine-readable label. This device information can be used by the second device to update a graphical user interface (GUI) for the network-connected device.

In an example, the user of the second device can utilize the second device to scan the machine-readable label and determine whether the machine-readable label includes a secondary layer that includes additional information for the network-connected device. If the machine-readable label includes a secondary layer, the second device may use the information specified in this secondary layer of the label to obtain device server information for the network-connected device. This device server information may include one or more identifiers for device records for the network-connected device. Further, the device server information may specify authentication information that may need to be provided to the device server to enable the user of the second device to obtain the device records for the network-connected device. The second device may utilize the information specified in this secondary layer of the machine-readable label to access the device server for the network-connected device and submit a query to obtain the device records associated with the network-connected device. These device records may specify state information over time for the network-connected device.

In response to the query, the device server may evaluate the data obtained from the user through the second device against the expected data that is specified in the secondary layer of the machine-readable label to determine whether to fulfill the user's request to obtain the device records for the network-connected device. If the device server is unable to authenticate the data provided by the user of the second device against the expected data from the secondary layer of the network-connected device, the device server may deny the request to obtain the device records for the network-connected device. However, if the device server is able to authenticate the provided data against the expected data from the secondary layer of the network-connected device, the device server may determine whether there are any device records available for the network-connected device. For instance, the device server may access a local (e.g., within the device server) device records datastore to determine whether there are any device records stored within. If there are no device records for the network-connected device in the device records datastore, the device server may access a device registry to determine whether any device records are available for the network-connected device. If so, the device server may obtain any available device records from the device registry and store these device records in the device records datastore. Further, the device server may transmit the identified device records to the user's second device. This may cause the user's second device to update the GUI for the network-connected device to present the user with the obtained device records.

In this manner, a user of a second device can utilize the second device to scan a machine-readable label presented on the network-connected device to interact with the network-connected device and to obtain any device records for the network-connected device. In addition, the techniques described and suggested in this disclosure enable additional technical advantages. For instance, because the device server evaluates the received data from the user's second device against the expected data specified in the secondary layer of the machine-readable label, the device server may regulate access to the network-connected device's state information. Thus, a user that cannot be authenticated based on the information specified in the secondary layer of the machine-readable label may not be able to determine the state of the network-connected device and may also not be able to provide state information to the device server to change the state of the network-connected device.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment 100 in which a controlling device 108 obtains one or more device records 112 for a device 102 from a device server 110 identified through scanning of a code 104 on the device 102 in accordance with at least one embodiment. In the environment 100, a user of a controlling device 108 may utilize the controlling device 108 to scan a code 104 (e.g., machine-readable label) presented on a network-connected device 102. The controlling device 108 may be a smartphone, tablet computer, laptop computer, smartwatch, or any other computing device that may include one or more peripheral devices and other devices installed therein. A user of the controlling device 108 may launch an application installed on the controlling device 108 to scan the code 104 presented on the network-connected device 102. For example, the application may initialize a camera installed on the controlling device 108 to obtain an image of the machine-readable label. Further, the camera may be used to obtain an image of the code 104, which may be used to obtain information regarding the network-connected device 102. Other peripheral devices installed on the controlling device 108 may include microphones, light sensors, motion sensors, global positioning system antennae, olfactory sensors and other sensors.

The network-connected device 102 may be an electronic device that includes a mechanism for communication (e.g. WiFi, Bluetooth®, Near Field Communication (NFC), etc.), a mechanism for determining its physical location, and a mechanism for processing and executing commands received from a controlling device 108 or device server 110. In some embodiments, the network-connected device 102 is a headless device that has no external display screen, buttons, or other types of controls for external control of the network-connected device 102. The network-connected device 102 may provide state information to a device server 110 over time. For instance, the network-connected device 102 may transmit, using HTTP, MQTT, or other communications protocols, state information for the device 102 to a device server 110. The device server 110 may store this state information in one or more device records 112. The one or more device records may function as state machines for the network-connected device 102, whereby the device records 112 may store a data structure used to track the state of the network-connected device 102 as the network-connected device 102 transmits state information to the device server 110 and as a controlling device transmits state information to the device server 110 destined for the network-connected device 102. The device server 110 may provide state information to the network-connected device 102 to cause the network-connected device 102 to change its state. As an illustrative example, if the network-connected device 102 is a thermostat usable to regulate the temperature within a particular room, the device server 110 may transmit state information to the device 102 that may cause the device 102 to perform one or more operations to change the temperature of the particular room and to present these new settings through use of an external display on the device 102.

As described above, the network-connected device 102 may include a machine-readable label or code 104 that may specify information about the network-connected device 102 and information that may be utilized by a controlling device 108 to access a device server 110 associated with the network-connected device 102 to obtain device records 112 for the network-connected device 102. The machine-readable label 104 may be presented on the network-connected device 102 through various methods. For instance, the network-connected device 102 may come pre-packaged with a sticker or other adhesive label that includes a printed representation of the machine-readable label 104. Alternatively, the network-connected device 102 may comprise a display element that is used to electronically display the machine-readable label 104. The machine-readable label 104 may also be generated at the time of manufacture of for the housing of the network-connected device 102. For instance, a manufacturer may utilize a 3-D printing device to create the housing which may include the machine-readable label 104. The machine-readable label 104 may also be presented in the form of one or more holographic images detectable by the controlling device 108. In some embodiments, the network-connected device 102 communicates with the device server 110 to obtain the machine-readable label 104 that is to be displayed on the network-connected device 102. The network-connected device 102 may present the machine-readable label 104 obtained from the device server 110 through use of the display element of the network-connected device 102.

In an embodiment, the machine-readable label comprises a label that encodes data using at least two different layers, each layer specifying different information that may be used by the controlling device 108 to identify the network-connected device 102, control the network-connected device 102, and to obtain device records 112 pertaining to the network-connected device 102 from the device servers 110. For instance, the primary layer of the machine-readable label 104 may be used to encode first information that can be extracted from the machine-readable label 104 through use of a first algorithm. The secondary layer of the machine-readable label 104 may alternatively be used to encode second information that can be extracted from the machine-readable label 104 through use of a second algorithm, which may be different from the first algorithm. The portions of the machine-readable label 104 that are utilized by the first algorithm and the second algorithm may be interspersed throughout the label 104 such that neither occupies a contiguous distinct region. The primary layer of the machine-readable label 104 may comprise one or more visible elements that may be detectable by a human or through a camera of the controlling device 108. For instance, the primary layer of the machine-readable label 104 may comprise a QR code, a UPC barcode, or any other barcode. Further this primary layer of the machine-readable label 104 may be printed onto the network-connected device 102 using traditional printing techniques, such as digital printing, flexographic printing, offset printing, rotogravure printing, and the like. In other examples, the network-connected device 102 may comprise a display element, such as a liquid crystal display (LCD), light emitting diode (LED) display, or any other suitable display that may be used to display the primary layer of the machine-readable label 104.

The primary layer of the machine-readable label 104 may specify information regarding the network-connected device 102. For instance, the primary layer of the machine-readable label 104 may specify one or more characteristics of the network-connected device 102 including, but not limited to, the make and model of the network-connected device 102, a Uniform Resource Identifier (URI) for a website that includes product specifications for the network-connected device 102, the manufacturing date of the network-connected device 102, the serial number of the network-connected device 102, and the like. The primary layer of the machine-readable label 104 may further specify a URI or other network address of a device server associated with the network-connected device 102. If the user of the controlling device 108 utilizes an application installed on the controlling device 108 to scan the machine-readable label 104, the application may obtain the information from the primary layer of the machine-readable label 104 and utilize the URI or other network address of the device server 110 to access the device server 110.

In some embodiments, the device server 110 prompts the user, through the controlling device 108, to provide a set of credentials that may be utilized to authenticate the user. For instance, the network-connected device 102 may have been purchased by the user through an online marketplace. In order to submit the order to purchase the network-connected device 102, the user may be required to provide or create a set of credentials that may be used to associate the network-connected device 102 with the user. These credentials may be stored within a remote device registry or within the device server 110 that is associated with the network-connected device 102. If the user, through its controlling device 108, provides its set of credentials to the device server 110, the device server 110 may evaluate the received set of credentials to determine whether the user can be authenticated. If the user is successfully authenticated, the device server 110 may transmit device control data for the network-connected device 102 to the controlling device 108. The device control data is data that may be utilized by the controlling device 108 to create a GUI for controlling the network-connected device 102 from the controlling device 108. In some embodiments, the response from the device server 110 might also specify the network address of the network-connected device 102 in order to enable direct communication between the controlling device 108 and the network-connected device.

The machine-readable label 104 may further include a secondary layer 106, which differs from the primary layer. The secondary layer 106 may be presented on the machine-readable label 104 through various methods. For instance, in an embodiment, the secondary layer 106 is printed on the machine-readable label 104 using a security ink that may be detectable under certain circumstances. For instance, the secondary layer 106 may be printed using an ink that is only detectable under ultraviolet (UV) light or other non-visible light spectra (e.g., infrared, x-rays, gamma rays, etc.) or that may be invisible until exposed to a heat source. The secondary layer 106 may alternatively be presented in the form of a radio-frequency identification (RFID) chip installed on the network-connected device 102 through introduction of the machine-readable label 104. In some instances, the secondary layer of the machine-readable label 104 may comprise a miniature machine-readable label using a similar format (e.g., the same format as the machine-readable label 104) to the machine-readable label 104 that may be detectable using a device with sufficient resolution to identify the miniature machine-readable label. For example, an algorithm utilized to read the primary layer of the machine-readable label 104 may be used to read the miniature machine-readable label that comprises the secondary layer 106. In some instances, the algorithm for encoding information in the primary layer and the secondary layer 106 are the same. The secondary layer 106 may be presented using a pictographic representation of an object, such as the lightning bolt illustrated in FIG. 1. In other instances, image steganography may be used to embed the secondary layer of the machine-readable label 104 on to the machine-readable label 104. Techniques for image steganography may include frequency domain steganography, nested image steganography, image bit-plane complexity segmentation steganography, and the like. In some embodiments, the secondary layer 106 can be obstructed by the primary layer of the machine-readable label 104. Thus, the application utilized by the controlling device 108 to scan the machine-readable label 104 may include instructions necessary to detect the secondary layer 106.

In some instances, the controlling device 108 may receive instructions from the device server 110 on how to detect the secondary layer of the machine-readable label 104. For example, if the user of the controlling device 108 is successfully authenticated by the device server 110, the device server 110 may provide, in addition to the device control data, information (e.g., algorithms, executable instructions, etc.) that may be used to detect the secondary layer of the machine-readable label 104. The controlling device 108 may utilize this information to configure an application used to scan the machine-readable label 104 to be able to detect the presence of a secondary layer of the machine-readable label 104. Alternatively, the device server 110 may provide the controlling device 108 with an application that, if installed on the controlling device 108, may enable the controlling device 108 to scan the machine-readable label 104 to detect the presence of one or more secondary layers. In some embodiments, the controlling device 108 enables the secondary layer to be read (e.g., by heating, shining a light at a particular frequency, scanning for particular radio frequency, etc.).

The secondary layer 106 of the machine-readable label 104 may specify information corresponding to the one or more device records that may be available for the network-connected device 102. For instance, the secondary layer 106 may specify one or more identifiers of device records stored within a device registry or in a device server 110 that may specify state information for the network-connected device 102 over time. The secondary layer 106 may further specify a URI or other network address of the device server 110 associated with the network-connected device 102. Thus, the controlling device 108 may utilize the information specified in the secondary layer 106 of the machine-readable label 104 to access the device server 110 and to query the device server 110 for the identified device records 112. The controlling device may submit, with the query, an image of the secondary layer 106 of the machine-readable label 104. The device server 110 may utilize this provided message for authentication of the query to obtain the device records 112 for the network-connected device 102.

In response to the query from the controlling device 108, the device server 110 may evaluate the provided image of the secondary layer 106 of the machine-readable label 104 to determine whether the provided image matches an expected image for the secondary layer 106. If the provided image of the secondary layer 106 cannot be authenticated by the device server 110, the device server 110 may deny the request from the controlling device 108 to obtain the device records 112 for the network-connected device 102. In some embodiments, in addition to the query, the controlling device 108 provides information specified in the secondary layer 106 that may be used for authentication of the controlling device 108. For instance, the information specified in the secondary layer 106 may specify a string of characters, a phrase, a sentence, a word or set of words, a numerical sequence, randomly selected alphanumeric characters, and the like. The device server 110 may utilize the information provided by the controlling device 108 to determine whether the controlling device 108 can be authenticated and thus, may be granted with the requested device records 112.

If the device server 110 is able to successfully authenticate the controlling device 108 based at least in part on the information provided by the controlling device 108, the device server 110 may determine whether the requested device records 112 are available. The device server 110 may evaluate its device records datastore, as well as a device registry for the network-connected device 102 to locate the requested device records 112. If the device server 110 is unable to locate the requested device records 112, the device server 110 may deny the request from the controlling device 108 and transmit a notification to the controlling device 108 to indicate that the requested device records 112 could not be found. However, if the device server 110 is able to locate the requested device records 112 from the device records datastore or the device registry, the device server 110 may obtain the requested device records 112 and transmit these device records 112 to the controlling device 108 to fulfill the request.

The controlling device 108, in response to obtaining the device records 112 from the device server 110, may update the GUI to display the various device records 112 for the user. The user may utilize the GUI to navigate through the various device records 112 and review state information for the network-connected device 102. In some embodiments, the user of the controlling device 108 may further utilize the GUI to create new state information that may be provided to the device server 110 and stored within a device record. If the user, through the controlling device 108, submits new state information for the network-connected device 102, the device server 110 may store the new state information in a device record for the network-connected device 102 and provide this device record to the network-connected device 102. This may cause the network-connected device 102 to update its state according to the state information provided by the user.

Figure 2:
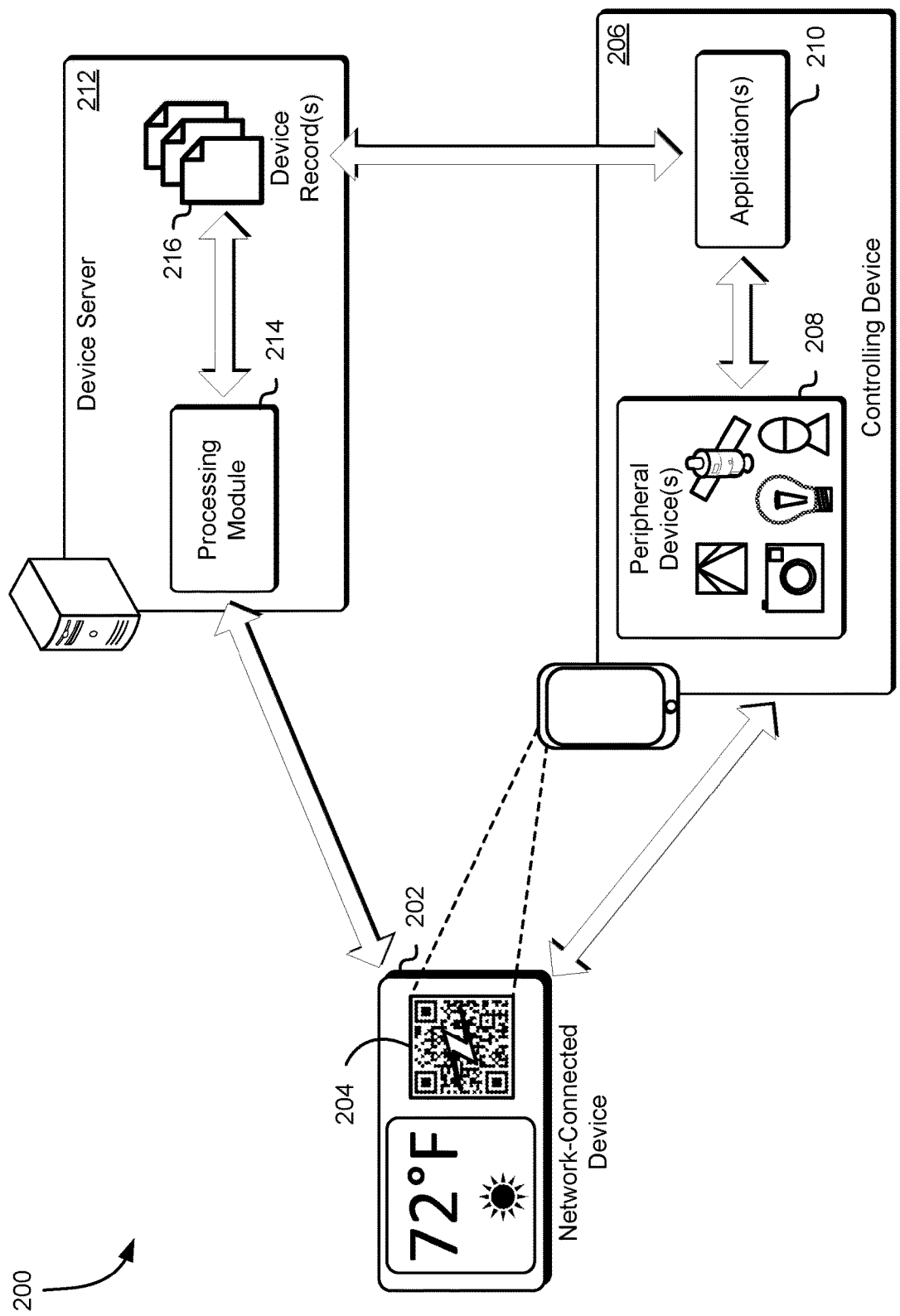
FIG. 2 shows an illustrative example of an environment in which a device interacts with a device server to provide state data that is recorded in one or more device records that can be obtained by a controlling device in accordance with at least one embodiment.

As noted above, a user may utilize a controlling device to scan a machine-readable label on a network-connected device to obtain information regarding the network-connected device and to obtain information that may be utilized to access a device server to obtain device control data for the network-connected device and to obtain any device records for the network-connected device. The network-connected device may also interact with the device server to provide device state information for the network-connected device. This device state information may be stored within one or more device records for the network-connected device. Accordingly, FIG. 2 shows an illustrative example of an environment 200 in which a network-connected device 202 interacts with a device server 212 to provide state data that is recorded in one or more device records 216 that can be obtained by a controlling device 206 in accordance with at least one embodiment.

In the environment 200, a network-connected device 202 may transmit device state information to a device server 212 associated with the network-connected device 202. The device server 212 may be one of various device servers of a network service that provides functionality for assisting in the identification of network-connected devices 202 and for communicating with these network-connected devices 202. In some embodiments, some or all of the functionality provided by the device server 212 associated with the network-connected device 202 may be implemented by the controlling device 206 and/or the network-connected device 202. In these embodiments, the controlling device 206 may communicate directly with the network-connected device 202 rather than through the device server 212.

The device server 212 may include a processing module 214, which may be an application or process operating within the device server 212 that obtains device state information from the network-connected device 202 and parses the device state information into one or more device records. Each device record may have a unique identifier that may be used to identify and locate the device record in response to queries from a controlling device 206 or in response to receipt of new device state information from the network-connected device 202 or the controlling device 206. The device records may be stored within a device records datastore 216, which may comprise one or more storage devices installed on the device server 212 for the storage of the device records. Alternatively, the device server 212 may store the device records within a device registry associated with the network-connected device 202.

In an embodiment, the network-connected device 202 includes a machine-readable label 204 that comprises at least a primary layer and a secondary layer. The network-connected device 202 may include a display element (e.g., LCD display, LED display, CRT display, etc.) that may be used to display the machine-readable label 204 to users of the network-connected device 202 and other entities. Alternatively, the machine-readable label 204 may be affixed to the network-connected device 202. For example, the machine-readable label 204 may be printed onto an adhesive sheet that is affixed to the network-connected device 202. The machine-readable label 204 may also be printed onto the network-connected device 202 itself during manufacture of the network-connected device 202. In some embodiments, the network-connected device 202 can broadcast the machine-readable label 204 to other devices that may be connected to the network-connected device 202 through a communications network, such as the Internet or a Local Area Network (LAN) connection.

The primary layer of the machine-readable label 204 may include device server information that may be used to identify the device server 212 that is associated with the network-connected device 202. Additionally, the primary layer of the machine-readable label 204 may specify information regarding the network-connected device 202 or information usable to access a website where the information regarding the network-connected device 202 may be found. The information regarding the network-connected device 202 may include the make and model of the network-connected device 202, the serial number of the network-connected device 202, the date of manufacture of the network-connected device 202, warranty information for the network-connected device 202, and the like. The primary layer of the machine-readable label 204 may comprise one or more visible elements that may be detectable by a human or through a camera or other peripheral device 208 of the controlling device 206. For instance, the primary layer of the machine-readable label 204 may comprise a QR code, a UPC barcode, or any other barcode. Further this primary layer of the machine-readable label 204 may be printed onto the network-connected device 202 using traditional printing techniques, such as digital printing, flexographic printing, offset printing, rotogravure printing, and the like.

A user of the controlling device 206 may utilize the controlling device 206 to scan the primary layer of the machine-readable label 204 to obtain the information specified in the primary layer of the machine-readable label 204. For instance, the user of the controlling device 206 may launch an application 210 installed on the controlling device 206 to interact with one or more peripheral devices 208 installed on the controlling device 206 to scan the primary layer of the machine-readable label 204, obtain the information specified in this primary layer, and perform one or more operations based at least in part on the information garnered from the primary layer. The peripheral devices that may be installed on the controlling device 206 may include a GPS antenna, a microphone, a light sensor, a motion sensor, and a camera, although not all embodiments of the present disclosure will include all such peripheral devices and additional peripheral devices may be installed on the controlling device 206 in addition to or as an alternative to the peripheral devices explicitly described herein.

The controlling device 206, through an application 210 installed on the device 206, may utilize the information obtained from the primary layer of the machine-readable label 204 to access the device server 212 associated with the network-connected device 202. The application 210 may submit a request to the device server 212 to obtain device control data for the network-connected device 202 to enable a user of the controlling device 206 to control the network-connected device 202 through use of an application 210 on its controlling device 206. In some embodiments, the device server 212, through the processing module 214, will attempt to authenticate the request from the controlling device 206 to determine whether the device control data may be provided to the controlling device 206. For instance, in response to the request, the device server 212 may prompt the user of the controlling device 206 to provide a set of credentials that may be used to authenticate the request. If the user is successfully authenticated, the device server 212 may transmit device control data for the network-connected device 202 to the controlling device 206. This may cause the application 210 installed on the controlling device 206 to utilize the device control data to provide a GUI that includes various controls for the network-connected device 202. The device control data may further be used to create a communications channel between the controlling device 206 and the network-connected device 202 in order to enable use of the GUI to control the network-connected device 202.

In some embodiments, the device control data includes executable instructions that may cause the controlling device 206 to install a new application 210 onto the controlling device 206 that may be used to control the network-connected device 202. A user of the controlling device 206 may launch this new application 210 to establish the communications channel with the network-connected device 202 and to transmit commands to the network-connected device 202. In some examples, the device server 212 may forego providing device control data and instead provide basic information about the network-connected device 202, such as the specifications of the network-connected device 202 and documentation regarding the features of the network-connected device 202.

The secondary layer of the machine-readable label 204 may be presented on the machine-readable label 204 through various methods. For instance, the secondary layer may be printed using an ink that is only detectable under UV light or other non-visible light spectra (e.g., infrared, x-rays, gamma rays, etc.) or that may be invisible until exposed to a heat source. The secondary layer may alternatively be presented in the form of a radio-frequency identification (RFID) chip installed on the network-connected device 202 through introduction of the machine-readable label 204. In some instances, the secondary layer of the machine-readable label 204 may comprise a miniature machine-readable label using a similar format to the machine-readable label 204 that may be detectable using a device with sufficient resolution to identify the miniature machine-readable label. The secondary layer may be presented using a pictographic representation of an object. In some embodiments, the secondary layer can be obstructed by the primary layer of the machine-readable label 204 such that an application 210 installed on the controlling device 206 and provided by a service associated with the device server 212 may be required to extract the secondary layer of the machine-readable label 204. While secondary layers of the machine-readable label are used throughout the present disclosure for the purpose of illustration, other information generated by the network-connected device 202 may be used as secondary information for obtaining the device records for the network-connected device 202. For instance, the network-connected device 202 may emit a signal (e.g., audio, radio, light, etc.) that can be detected by the controlling device 206 if the controlling device 206 is within a proximity range of the network-connected device 202.

As described above, the secondary layer of the machine-readable label 204 may specify information that may be utilized by the controlling device 206 to identify the one or more device records that may be available for the network-connected device 202. For instance, the secondary layer may specify one or more identifiers of device records stored within a device registry or in a device records datastore 216 of the device server 212 that may specify state information for the network-connected device 202 over time. The secondary layer may further specify a URI or other network address of the device server 212 associated with the network-connected device 202. Thus, the controlling device 206, through use of an application 210, may utilize the information specified in the secondary layer of the machine-readable label 204 to access the device server 212 and to query the device server 212 for the identified device records. The controlling device may submit, with the query, an image of the secondary layer of the machine-readable label 204. The processing module 214 of the device server 210 may utilize this provided message for authentication of the query to obtain the device records for the network-connected device 202.

If the device server 212 is able to successfully authenticate the controlling device 206 based at least in part on the information provided by the controlling device 206, the device server 212 may determine whether the requested device records are available. The device server 212 may evaluate its device records datastore 216, as well as a device registry for the network-connected device 202 to locate the requested device records. If the device server 212 is able to locate the requested device records from the device records datastore 216 or the device registry, the device server 212 may obtain the requested device records and transmit these device records to the controlling device 206 to fulfill the request. The controlling device 206, in response to obtaining the device records from the device server 212, may update the GUI to display the various device records for the user. The user may utilize the GUI to navigate through the various device records and review state information for the network-connected device 202.

In some embodiments, if the device server 212 is able to successfully authenticate the controlling device 206, the device server 212 transmits an authentication token to the controlling device 206. The token provided to the controlling device 206 may be used by the controlling device 206 to access the device server 212 without need to scan the machine-readable label 204 for either the primary or secondary layer of the machine-readable label 204. The token may be time-bound, such that the token automatically expires after a specified period of time has passed. Thus, if the device server 212 receives a request from the controlling device 206 to obtain the device control data or the device records for the network-connected device 202, and the request includes the token, the device server 212 may evaluate the token to determine whether the token has expired and, if it has not expired, whether the controlling device 206 may be provided with the device control data and/or the device records for the network-connected device 202. If the token has expired, the controlling device 206 may be required to re-scan the primary layer and the secondary layer of the machine-readable label 204 to gain access to the device control data and the device records, respectively. In some embodiments, if the controlling device 206 submits a valid token that has not expired, the device server 212 provides the controlling device 206 with a new token that can be used to access the device server 212.

Figure 3:
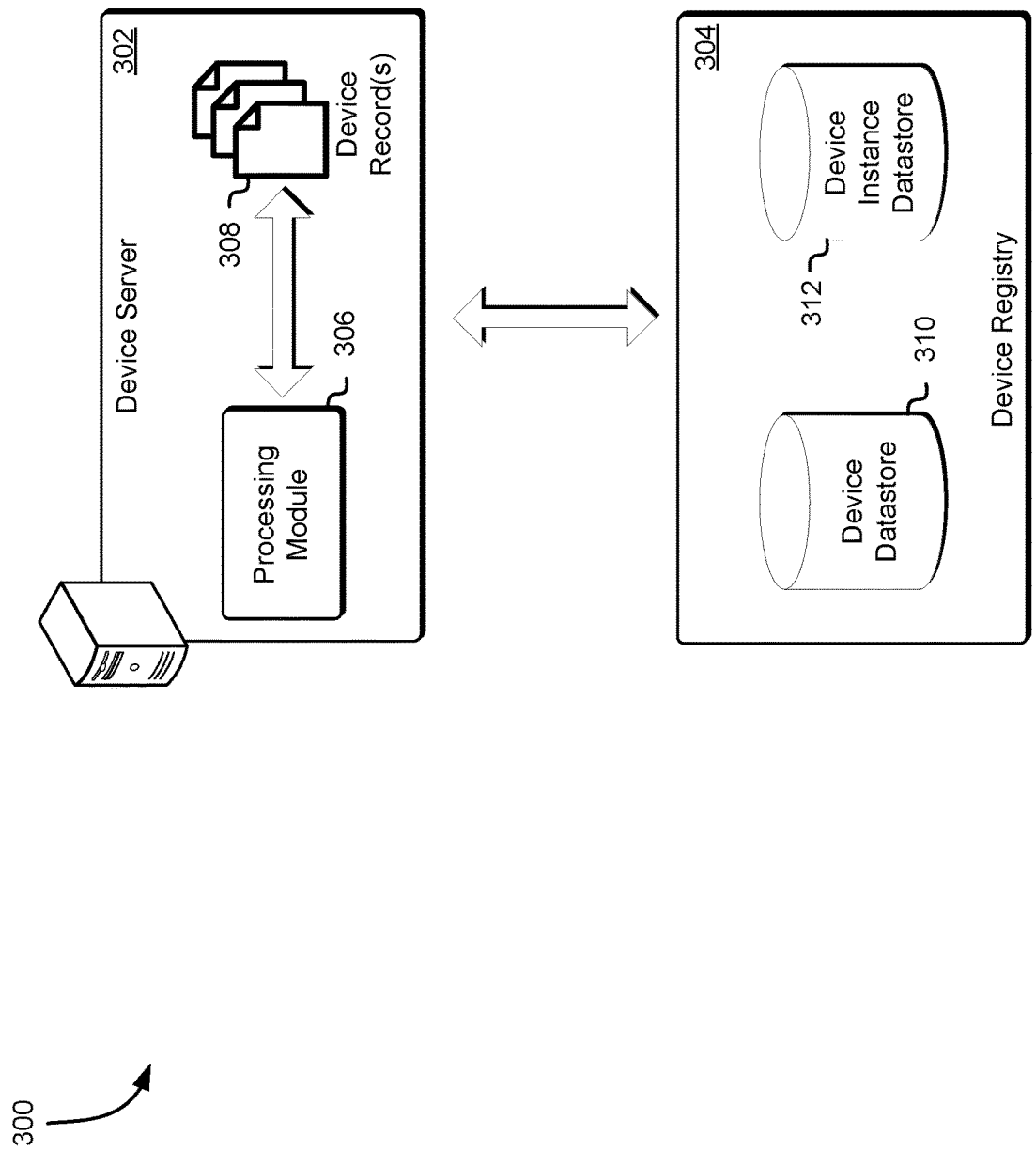
FIG. 3 shows an illustrative example of an environment in which a device server obtains device information from a device registry to determine whether to enable a controlling device to access device records of a device in accordance with at least one embodiment.

As noted above, the device server associated with the network-connected device may access a device registry to obtain device control data and device records for the network-connected device if such data is not available within the device server. Accordingly, FIG. 3 shows an illustrative example of an environment 300 in which a device server 302 obtains device information from a device registry 304 to determine whether to enable a controlling device to access device records of a device in accordance with at least one embodiment. As shown in FIG. 3, the device registry 304 includes a device datastore 310. The device datastore 310 may include data regarding known network-connected devices. This data may be utilized to identify a particular instance of a network-connected device. In an embodiment, the device datastore 310 includes a unique device ID for each known network-connected device. The unique device ID may be a stock keeping unit ("SKU") number or another type of unique identifier that uniquely identifies a type of device. For each unique device ID, the device datastore 310 may also include a textual device description that describes the particular device type. The device datastore 310 may also include information for each machine-readable label provided for each network-connected device.

The device datastore 310 may also include device control data for known network-connected devices. The device control data is data that may be utilized by the controlling device to create the GUI for controlling the operation of the network-connected device. For example, the device control data may include HyperText Markup Language (HTML) 5 code, JavaScript, and/or other types of program code that describe how commands are to be transmitted to a particular network-connected device, how status information can be retrieved from a network-connected device, application programming interfaces (APIs) exposed by a network-connected device, and/or other types of data. In response to a query from a controlling device to obtain the device control data for a particular network-connected device, the device control data may be transmitted to the controlling device for use in creating the GUI and for transmitting commands to the network-connected device.

In an embodiment, the device control data is defined using JavaScript Object Notation (JSON). In this way, JSON may be utilized to define in a standard way the commands that may be performed on the network-connected device. For example, JSON may be utilized to describe that a particular network-connected device implements "on" and "off" commands. The device registry 304, the device server 302, and/or the controlling device might also discover the available commands from the network-connected device. For example, and without limitation, the network-connected device may expose one or more APIs through which the commands the network-connected device supports may be discovered. A JSON payload indicating the available commands may be returned in response to a call to such an API. An abstraction layer executing on the controlling device may utilize this information to format commands in a specific way for consumption by a network-connected device.

As illustrated in FIG. 3, the device registry 304 is also equipped in one configuration with a device instance datastore 312. The device instance datastore 312 may store information for instances of a particular type of network-connected device that has been registered with the device registry 304. In order to register with the device registry 304, the network-connected device may send a registration request to the device registry 304 that includes information regarding the network-connected device, such as the serial number of the device, the make and model of the device, the manufacturing date of the device, and the like. In some embodiments, if the network-connected device is configured to display, using the display element, the machine-readable label, the device registry 304 can provide data to the network-connected device that can be used to generate and display the machine-readable label on the network-connected device. However, if the machine-readable label is printed onto the device or is affixed to the device, the device registry 304 may maintain the information specified in the machine-readable label without need for the device to provide such information.

The registration request from the network-connected device may also include a network address for communicating with the network-connected device and the device ID that uniquely identifies the network-connected device. In turn, the device registry 304 may identify an entry in the device datastore 310 corresponding to the network-connected device based at least in part on the device ID of the network-connected device. It should be noted that the network-connected device may not be directly accessible in some configurations. In these configurations, the network address may identify a gateway or other type of communications device that enables communication with the network-connected device. In this regard, it should be noted that the network address may be optional and that other mechanisms may be utilized for enabling communication with the network-connected device.

The device registry 304 may also create an entry in the device instance datastore 312 for the network-connected device that uniquely identifies the instance of the network-connected device. For instance, a unique device instance ID may be stored in the device registry 304 that uniquely identifies the particular instance of the network-connected device. For example, the unique serial number or other unique identifier for a network-connected device may be stored. The network-connected device provides the device instance ID in some configurations. The entry may also include data indicating the network address of the network-connected device. This information may be utilized in some configurations to enable the controlling device to identify and control the network-connected device.

In an embodiment, the device server 302 transmits a request to the device registry 304 to obtain the device control data and other entries for a particular network-connected device from the device registry 304. For instance, if the device server 302, through its processing module 306, receives a request from a controlling device to obtain device control data from the device server 302, the device server 302 may determine whether it has stored the device control data for the specified network-connected device. If it does not have the necessary device control data, the processing module 306 may transmit a request to the device registry 304 to obtain the device control data for the network-connected device. This may cause the device registry 304 to access the device datastore 310 to obtain the requested device control data. The processing module 306 may receive the device control data from the device registry 304 and provide the device control data to the controlling device to fulfill the request. Further, the processing module 306 may store the device control data locally within one or more storage devices of the device server 302 or in a cache of the device server 302.

The device server 302 may further include a device records datastore 308, which may be used to store the device records for network-connected devices associated with the device server 302. The device records may specify state information for a network-connected device. A network-connected device may transmit state information to the device server 302 over time. The processing module 306 may obtain the state information from the network-connected device and identify the one or more device records associated with the network-connected device that are utilized to maintain the state information for the network-connected device. The processing module may update the device records for the network-connected device to specify the received state information. Each device record stored in the device records datastore 308 may be identified through a unique identifier assigned to the device record. Thus, in response to a query from a controlling device to obtain the one or more device records associated with the network-connected device, the processing module may evaluate the unique identifiers provided in the query and determine whether these identifiers correspond to any device records stored in the device records datastore 308. If the processing module 306 is able to locate the requested device records within the device records datastore 308, the processing module 306 may transmit the requested device records to the controlling device to fulfill the request.

Figure 4:
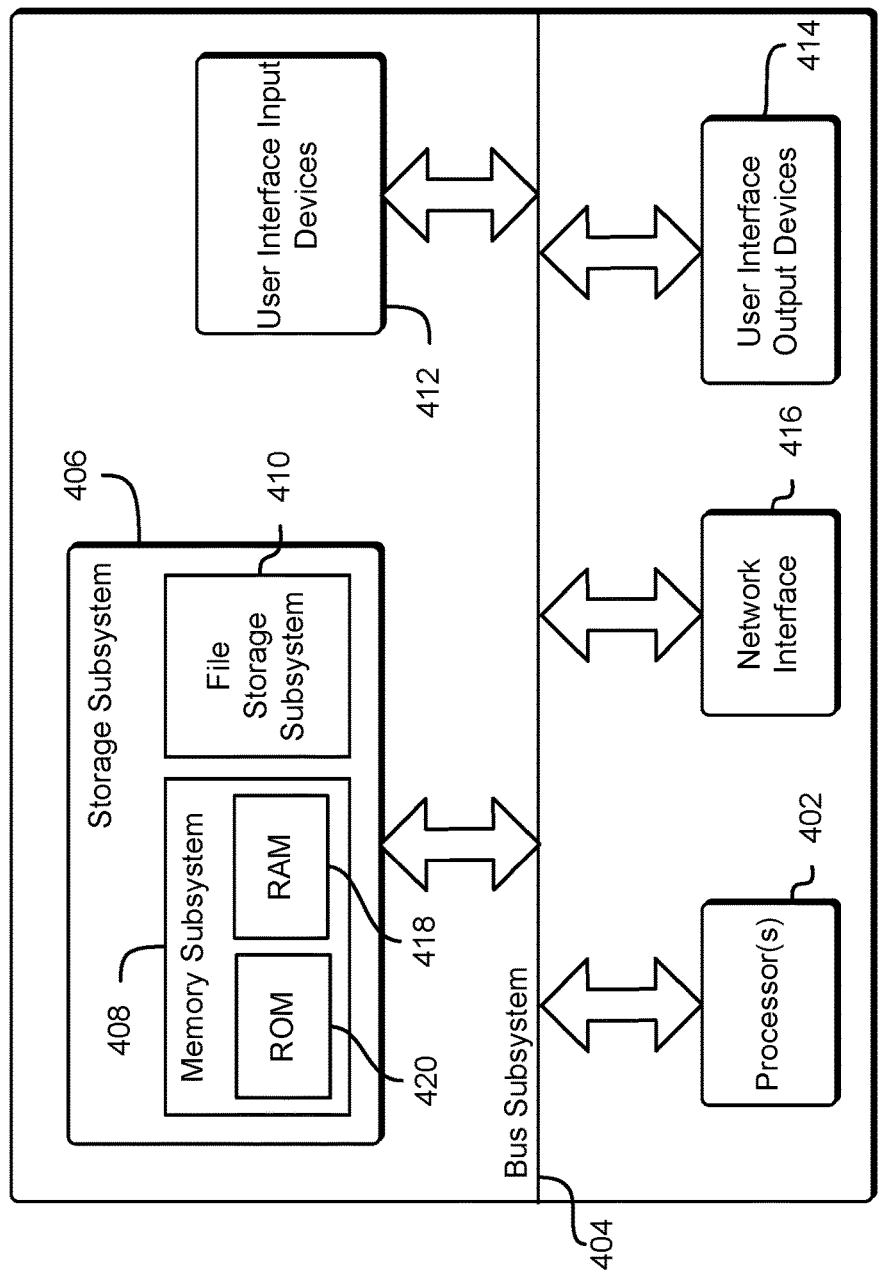
FIG. 4 shows an illustrative example of an example device system that may be used in accordance with at least one embodiment.

FIG. 4 shows an illustrative example of an example device system 400 that may be used in accordance with at least one embodiment. In various embodiments, the device system 400 may be used to implement any of the systems illustrated herein and described above. For example, the device system 400 may be used to scan a machine-readable label presented on a network-connected device and utilize information garnered from the machine-readable label to obtain device control data for the network-connected device from a device server and to obtain one or more device records for the network-connected device. Further, the device system 400 may be used to transmit commands to the network-connected device to perform one or more operations. Alternatively, the device system 400 may correspond to the network-connected device, which may communicate with the device server to provide state information and to perform one or more operations based at least in part on commands received from a controlling device. In some embodiments, the device system 400 further utilizes a display element to display a machine-readable label that may comprise information usable by a controlling device to access the device server, obtain device control data and obtain device records for the network-connected device.

As shown in FIG. 4, the device system 400 may include one or more processors 402 that may be configured to communicate with and are operatively coupled to a number of peripheral subsystems via a bus subsystem 404. These peripheral subsystems may include a storage subsystem 406, comprising a memory subsystem 408 and a file storage subsystem 410, one or more user interface input devices 412, one or more user interface output devices 414, and a network interface subsystem 416. The bus subsystem 404 may provide a mechanism for enabling the various components and subsystems of device system 400 to communicate with each other as intended. Although the bus subsystem 404 is shown schematically as a single bus, alternative embodiments of the bus subsystem may utilize multiple busses.

The network interface subsystem 416 may provide an interface to other device systems and networks. The network interface subsystem 416 may serve as an interface for receiving data from and transmitting data to other systems from the device system 400. For example, the network interface subsystem 416 may enable a user to connect the controlling device to a wireless network such that the controlling device may transmit and receive data while in a remote location. As another example, the network-connected device may communicate with a device server to transmit and receive state information over time. Additionally, the network-connected device may receive transmissions from the controlling device through a similar wireless access point. The network interface subsystem 416 may also facilitate the receipt and/or transmission of data on other networks.

The user interface input devices 412 may include one or more buttons, a keyboard, pointing devices such as an integrated mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to the device system 400.

User interface output devices 414 may include a display subsystem, a printer, or non-visual displays such as audio output devices, etc. The display subsystem may be a CRT, a flat-panel device such as a LCD, LED display, or a projection or other display device. In general, use of the term "output device" is intended to include all possible types of devices and mechanisms for outputting information from the device system 400. The output device(s) 414 may be used, for example, to present user interfaces to facilitate user interaction with applications performing processes described herein and variations therein, when such interaction may be appropriate.

The storage subsystem 406 may provide a computer-readable storage medium for storing the basic programming and data constructs that may provide the functionality of at least one embodiment of the present disclosure. The applications (programs, code modules, instructions) that, when executed by one or more processors, may provide the functionality of one or more embodiments of the present disclosure, may be stored in the storage subsystem 406. These application modules or instructions may be executed by the one or more processors 402. The storage subsystem 406 may additionally provide a repository for storing data used in accordance with the present disclosure. The storage subsystem 406 may comprise a memory subsystem 408 and a file/disk storage subsystem 410.

The memory subsystem 408 may include a number of memories including a main random access memory (RAM) 418 for storage of instructions and data during program execution and a read only memory (ROM) 420 in which fixed instructions may be stored. The file storage subsystem 410 may provide a non-transitory persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

The device system 400 may be of various types including a portable computer device, tablet computer, a workstation, or any other data processing system that may provide portability for a merchant or other user of the device. Additionally, the device system 400 may include one or more connectors (e.g., USB, a headphone jack, Lightning® connector, etc.) that may be used to connect the device system 400 to another device. Due to the ever-changing nature of computers and networks, the description of the device system 400 depicted in FIG. 4 is intended only as a specific example for purposes of illustrating the preferred embodiment of a network-connected device or a controlling device. Many other configurations having more or fewer components than the system depicted in FIG. 4 are possible.

Figure 5:
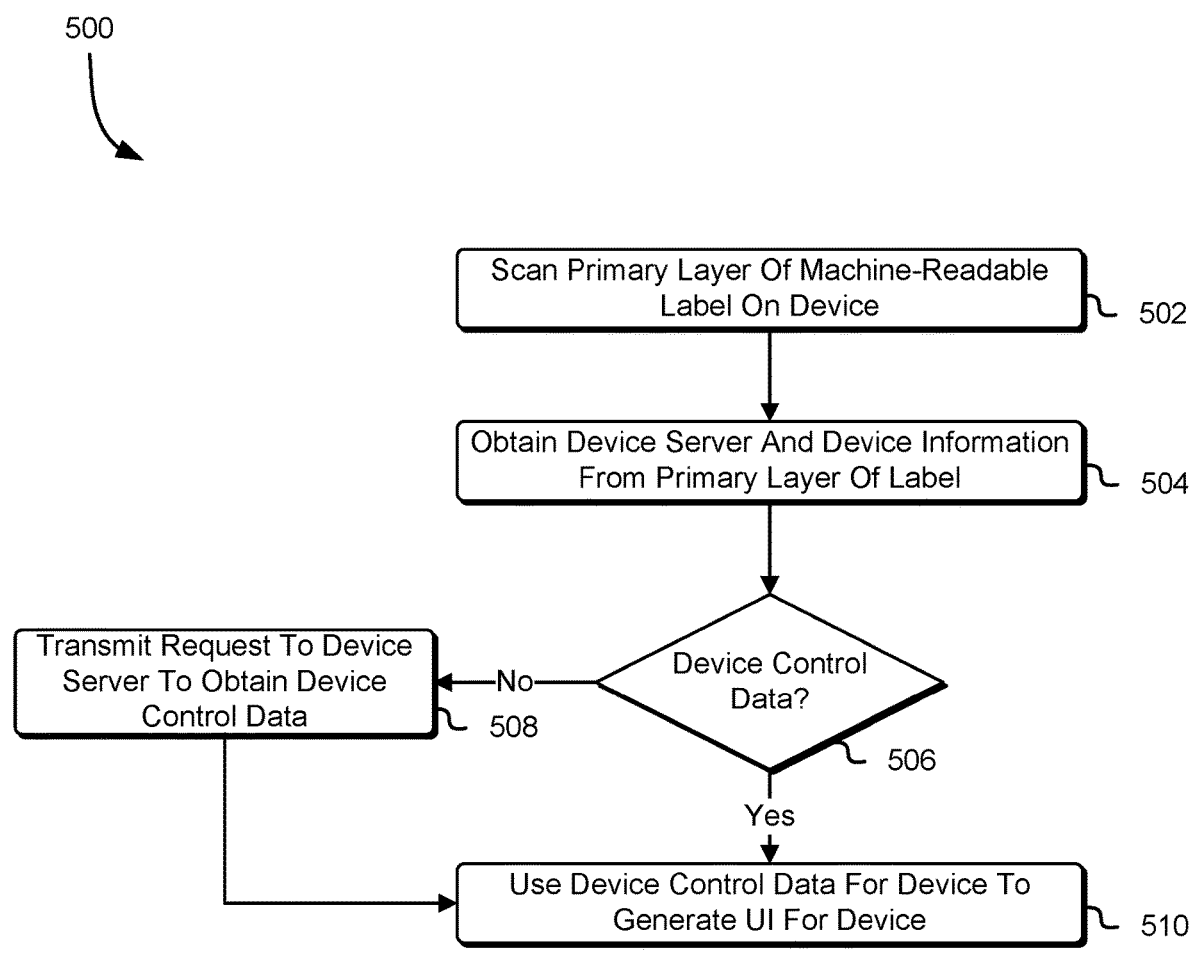
FIG. 5 shows an illustrative example of a process for obtaining device control data for generating a user interface for a device in accordance with at least one embodiment.

As noted above, a user may utilize a controlling device to scan a primary layer of a machine-readable layer to obtain information necessary to access a device server associated with a network-connected device. The controlling device may obtain, from the device server, device control data for the network-controlled device. The device control data may be used to present the user with a GUI that may be used to control the network-connected device or to otherwise obtain information from the network-connected device. Accordingly, FIG. 5 shows an illustrative example of a process 500 for obtaining device control data for generating a user interface for a device in accordance with at least one embodiment. The process 500 may be performed by a controlling device that is capable of scanning machine-readable labels presented on a network-connected device. The controlling device may further be capable of transmitting one or more requests to a device server associated with the network-connected device through a communications network, such as the Internet.

In an embodiment, a user of the controlling device launches an application installed on the controlling device to scan a machine-readable label presented on a network-connected device. The application may be provided by a service through which the user configured access to the network-connected device or through which the user may have purchased the network-connected device for its use. The application may interact with one or more peripheral devices of the controlling device to capture an image of the machine-readable label and to decipher the image to obtain information from the machine-readable label. As described above, the machine-readable label may comprise a primary layer and a secondary layer. The primary layer of the machine-readable label may comprise one or more visible elements that may be detectable by a human or through a camera of the controlling device. For instance, the primary layer of the machine-readable label may comprise a QR code, a UPC barcode, or any other barcode. Thus, the controlling device may scan 502 the primary layer of the machine-readable label on the network-connected device.

The controlling device may utilize the scan of the primary layer of the machine-readable label to obtain information specified in the primary layer of the machine-readable label. For instance, the primary layer of the machine-readable label may specify one or more characteristics of the network-connected device including, but not limited to, the make and model of the network-connected device, a URI for a website that includes product specifications for the network-connected device, the manufacturing date of the network-connected device, the serial number of the network-connected device, and the like. The primary layer of the machine-readable label may further specify a URI or other network address of a device server associated with the network-connected device. Thus, the controlling device may obtain 504 the device server information and network-connected device information from the primary layer of the machine-readable label.

In some embodiments, the primary layer of the machine-readable label specifies device control data that may be used by the controlling device to generate a GUI that a user of the controlling device may utilize to transmit commands to the network-connected device. Alternatively, the primary layer of the machine-readable label may not include this device control data, as the controlling device may be required to communicate with the device server associated with the network-controlled device to obtain the device control data of the network-controlled device. The controlling device may thus utilize the information specified in the primary layer of the network-controlled device to determine 506 whether this information includes the device control data for the network-controlled device.

If the information garnered from the scanned primary layer of the machine-readable label does not include the device control data for the network-connected device, the controlling device may utilize the device server information from the primary layer to establish a connection with the device server associated with the network-connected device. In response to establishing a successful network connection with the device server, the controlling device may transmit 508 a request to the device server to obtain the device control data for the network-controlled device. The request may specify one or more identifiers of the network-controlled device, such as a serial number of the network-controlled device or other unique information specified in the primary layer of the machine-readable label presented on the network-connected device. As will be described in greater detail below, the device server may utilize these unique identifiers of the network to obtain the device control data from its datastores or from a device registry. The device server may provide the device control data to the controlling device to fulfill the request.

In response to obtaining the device control data for the network-connected device from the device server or from the primary layer of the machine-readable label, the controlling device may use 510 the device control data for the network-connected device to generate a GUI for the network-connected device. As described above, the device control data may be defined using JSON. In this way, JSON may be utilized to define in a standard way the commands that may be performed on the network-connected device. Thus, through the GUI, a user of the controlling device may transmit commands to the network-connected device to perform one or more operations.

Figure 6:
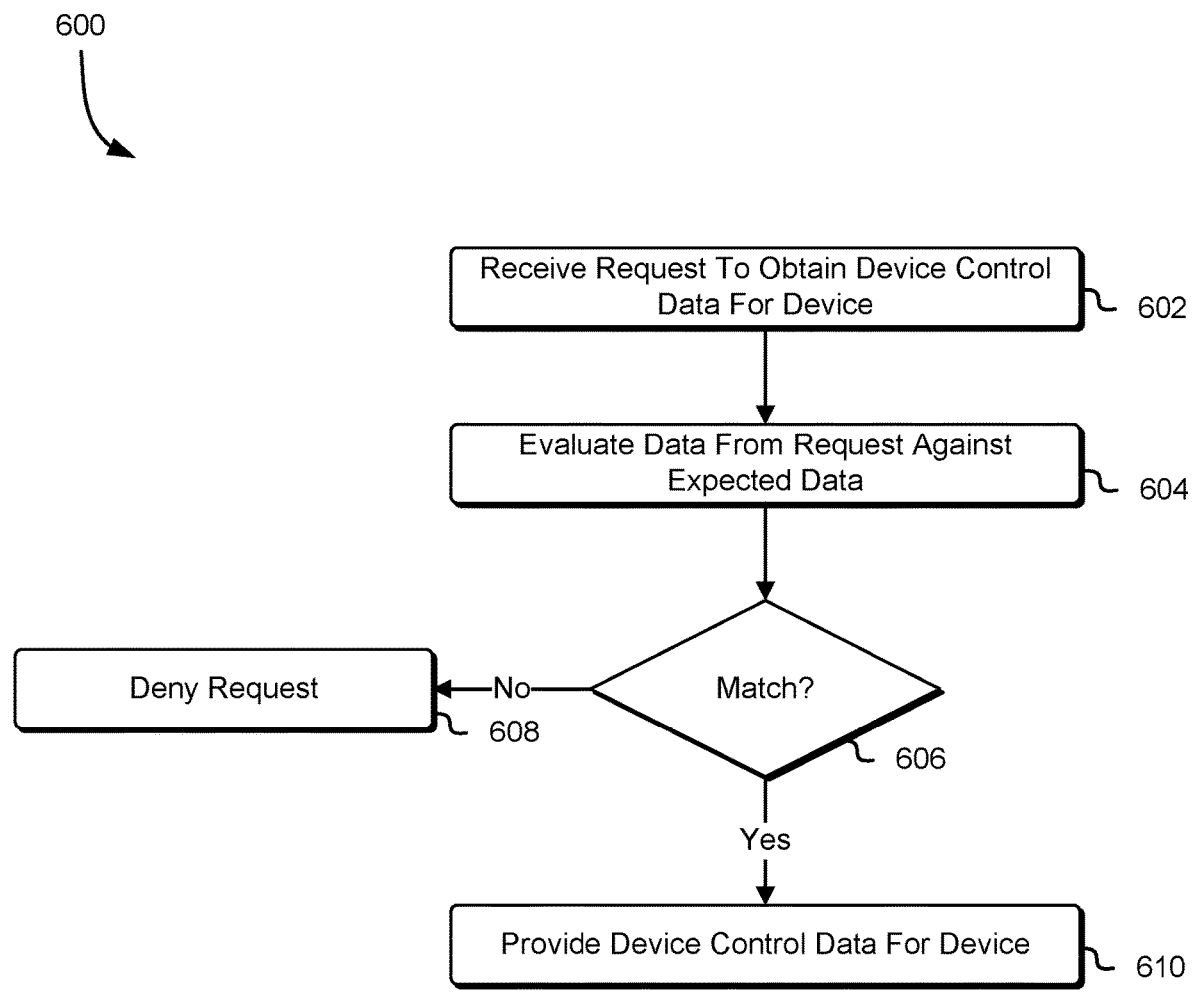
FIG. 6 shows an illustrative example of a process for processing incoming requests to obtain device control data for a particular device to enable generation of a user interface for the device in accordance with at least one embodiment.

As noted above, in response to a request from a controlling device to obtain device control data for a network-connected device, a device server may access a device registry and its own datastores to identify the device control data for the network-connected device. In some embodiments, the device server utilizes information provided in the request to authenticate the controlling device and determine whether the request from the controlling device is to be fulfilled. Accordingly, FIG. 6 shows an illustrative example of a process 600 for processing incoming requests to obtain device control data for a particular device to enable generation of a user interface for the device in accordance with at least one embodiment. The process 600 may be performed by the aforementioned device server, which may receive requests from controlling devices and other devices to obtain device control data. Further, the aforementioned device server may communicate with one or more device registries to obtain the requisite device control data necessary to fulfill incoming requests to obtain device control data.

At any time, the device server may receive 602 a request from a controlling device or other device to obtain device control data for a particular network-connected device. The request from the controlling device or other device may specify information garnered from the primary layer of the machine-readable label presented on the network-connected device. Additionally, the request may include a set of credentials associated with the controlling device or a particular user of the controlling device. For instance, in order to submit a request to the device server to obtain the device control data for a network-connected device, a user of the controlling device may be required to provide a set of credentials for authentication purposes. The set of credentials may include a username and password, a cryptographic key, a digital signature, and the like.

In response to the request from the controlling device or other device, the device server may evaluate 604 the data provided in the request against the expected data that is to be received. For instance, a request to obtain the device control data may include information necessary to identify the network-connected device for which the device control data is to be obtained. Further, the request to obtain the device control data may specify information about the network-connected device, such as the serial number of the network-connected device, the make and model of the network-connected device, the date of manufacture of the network-connected device, and the like. The device server may cross-reference this information against a device profile for the network-connected device to determine 606 whether the provided information and information in the device profile match.

In some embodiments, if the request includes a set of credentials for the user of the controlling device, the device server transmits the set of credentials to an authentication service. The authentication service may be a stand-alone service that may be used to determine whether a provided set of credentials for a particular identity are valid. For instance, the authentication service may evaluate the provided set of credentials using information in a user's profile to determine whether the set of credentials are valid. Further, the authentication service may identify one or more policies associated with the request to determine whether the user is authorized to obtain the device control data from the device server. If the authentication service is unable to authenticate the set of credentials or determines that the user is not authorized to obtain the device control data from the device server, the authentication service may transmit a response to the device server indicating that the request from the controlling device is to be denied. Otherwise, if the set of credentials are successfully authenticated and the user is authorized to obtain the requested device control data for the network-connected device, the authentication service may transmit a response to the device server indicating that the request may be fulfilled.

If the information provided in the request and the information in the device profile associated with the network-controlled device match, the network server may query its datastores to determine whether the device control data is stored therein. For instance, the device server may utilize a unique identifier of the network-connected device to query these datastores to locate the device control data for the network-connected device. If the device server is unable to locate the device control data within its datastores, the device server may transmit a request to a device registry associated with the network-connected device to obtain the device control data. The device server may provide 610 the device control data for the network-connected device to the controlling device to fulfill the request. However, if the information provided in the request and the information in the device profile associated with the network-controlled device do not match, the device server may deny 608 the request.

Figure 7:
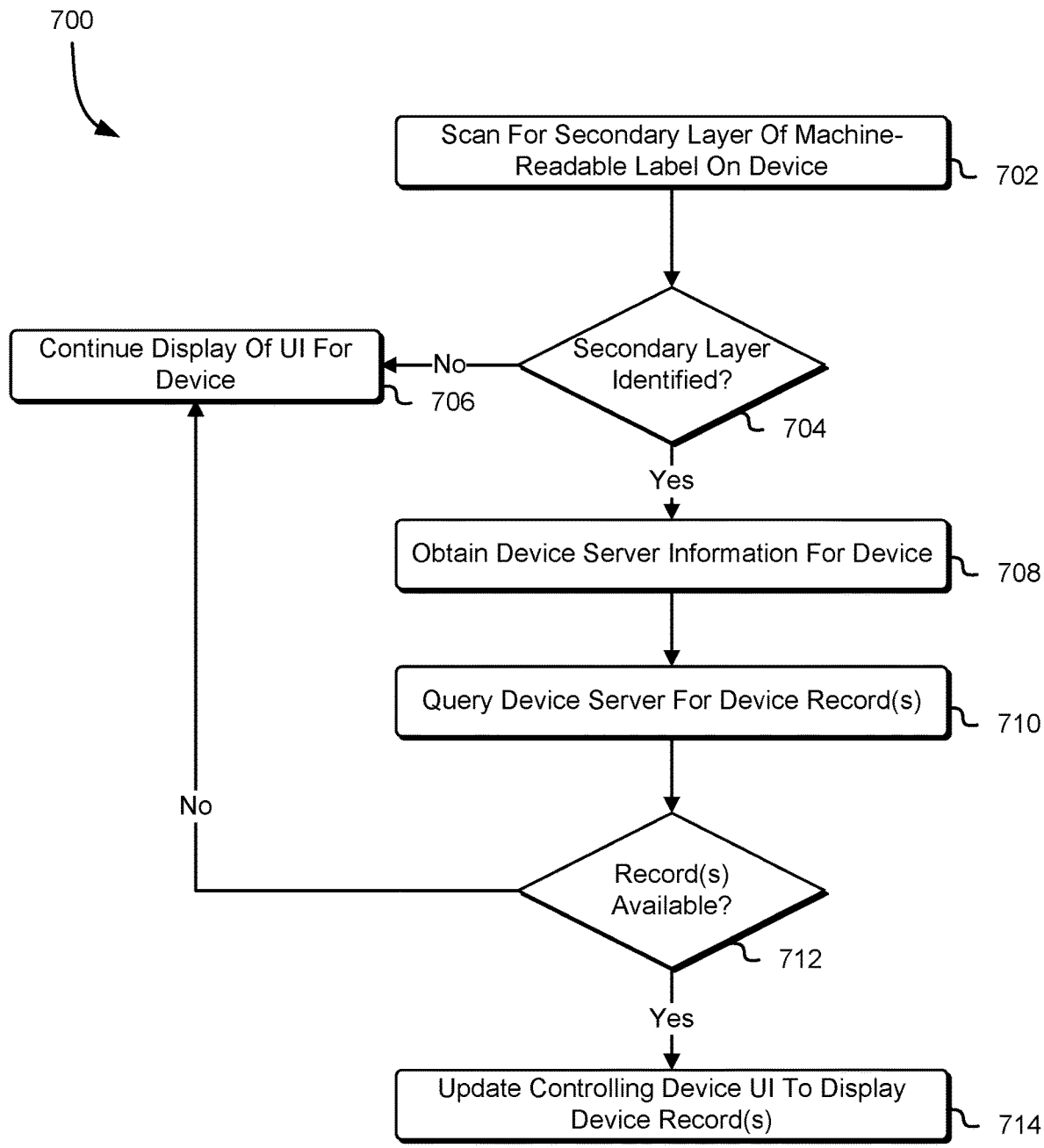
FIG. 7 shows an illustrative example of a process for querying a device server to obtain device records for a particular device in accordance with at least one embodiment.

As noted above, a user of a controlling device can utilize the controlling device to scan the machine-readable label to determine whether the machine-readable label includes a secondary layer that includes additional information for the network-connected device. If the machine-readable label includes a secondary layer, the controlling device may use the information specified in this secondary layer of the label to obtain additional device server information for the network-connected device. This additional device server information may include one or more identifiers for device records for the network-connected device. Accordingly, FIG. 7 shows an illustrative example of a process 700 for querying a device server to obtain device records for a particular device in accordance with at least one embodiment. The process 700 may be performed by the aforementioned controlling device, which may utilize one or more peripheral devices to scan the machine-readable label presented by the network-connected device to obtain information specified in a secondary layer of the machine-readable label. Further, the connecting device may communicate with the device server to submit a request to obtain one or more device records for the network-connected device.

In an embodiment, the controlling device utilizes one or more peripheral devices to scan 702 the machine-readable label to identify a secondary layer of the machine-readable label that may be present and that is distinct from the primary layer of the machine-readable label. The secondary layer may be presented on the machine-readable label through various methods. For instance, the secondary layer may be printed on the machine-readable label using a security ink that may be detectable under certain circumstances. The secondary layer may alternatively be presented in the form of a RFID chip installed on the network-connected device through introduction of the machine-readable label. In some instances, the secondary layer of the machine-readable label may comprise a miniature machine-readable label using a similar format to the machine-readable label that may be detectable using a device with sufficient resolution to identify the miniature machine-readable label. The secondary layer may also be presented using a pictographic representation of an object.

In some instances, the controlling device may receive instructions from the device server on how to detect the secondary layer of the machine-readable label. For example, if the user of the controlling device is successfully authenticated by the device server, as described above in connection with FIG. 6, the device server may provide, in addition to the device control data, information that may be used to detect the secondary layer of the machine-readable label. The controlling device may utilize this information to configure an application used to scan the machine-readable label to be able to detect the presence of a secondary layer of the machine-readable label. Alternatively, the device server may provide the controlling device with an application that, if installed on the controlling device, may enable the controlling device to scan the machine-readable label to detect the presence of one or more secondary layers.

Based at least in part on a scan of the machine-readable label, the controlling device may determine 704 whether a secondary layer of the machine-readable label has been identified. If the controlling device is unable to identify the secondary layer of the machine-readable label, the controlling device may continue 706 to display the GUI for use of the network-controlled device. The GUI may be the same GUI generated using the device control data obtained from the device server and described above in connection with FIG. 6. However, if the controlling device is able to identify a secondary layer of the machine-readable label, the controlling device may obtain 708, from the secondary layer of the machine-readable label, device server information for the network-connected device. For instance, the secondary layer of the machine-readable label may specify information that may be utilized by the controlling device to identify the one or more device records that may be available for the network-connected device. For example, the secondary layer may specify one or more identifiers of device records stored within a device registry or in a device server that may specify state information for the network-connected device over time. The secondary layer may further specify a URI or other network address of the device server associated with the network-connected device.

The controlling device may establish a network connection with the device server associated with the network-connected device to query 710 the device server for the one or more device records of the network-connected device. The query may specify one or more unique identifiers of the device records associated with the network-connected device, as specified in the secondary layer of the machine-readable layer. In some embodiments, the query further includes a set of credentials associated with the user of the controlling device or the controlling device itself. As described above, the device server may transmit the set of credentials to an authentication service, which may be used to determine whether a provided set of credentials for a particular identity are valid. If the set of credentials are successfully authenticated and the user is authorized to obtain the requested device records for the network-connected device, the authentication service may transmit a response to the device server indicating that the request may be fulfilled.

Based at least in part on the response from the device server, the controlling device may determine 712 whether there are any device records available for the network-connected device. For instance, if the device server determines that it is unable to authenticate the query from the controlling device (e.g., the set of credentials provided are not valid, etc.), the device server may not provide the requested device records to the controlling device. Similarly, if the device server is unable to locate the device records identified in the query, the device server may indicate that the device records for the network-connected device are not available. Thus, if the device records for the network-connected device are not available, the controlling device may continue 706 to display the GUI for the network-connected device to enable continued use of the network-connected device. This may enable the user, through the controlling device, to transmit commands to the network-connected device.

If the controlling device receives the requested device records for the network-connected device from the device server, the controlling device may update 714 the GUI to display the received device records. For instance, the controlling device may update the GUI to display a graphical representation for each device record received. A user of the controlling device may select the graphical representation of the device record to access the device record and review any state information specified therein. In some embodiments, through the GUI, the user of the controlling device can update the state information in a device record. This may cause the controlling device to transmit the updated device record to the device server, which may update the device record to specify the new state information provided by the user of the controlling device. The device server may transmit this new state information to the network-connected device, which may change its state based at least in part on this new state information.

It should be noted that while device records are used extensively throughout the present disclosure for the purpose of illustration, the controlling device may scan for the secondary layer of the machine-readable label on the network-connected device to obtain other information. For instance, rather than submitting a query to the device server for the device records of the network-connected device, the controlling device may query the device server for device control data of the device. Thus, the use of the primary layer of the machine-readable label, as described above in connection with FIG. 5, and the use of the secondary layer of the machine-readable label may be reversed, such that the primary layer of the machine-readable label may be used to obtain the device records and the secondary layer of the machine-readable label may be used to obtain the device control data. In some embodiments, the secondary layer of the machine-readable label is utilized to obtain additional device control data different from the device control data obtained through use of the primary layer. For instance, the device control data garnered through use of the secondary layer of the machine-readable label may enable the controlling device to access advanced functions otherwise unavailable through the device control data garnered through use of the primary layer of the machine-readable label.

Figure 8:
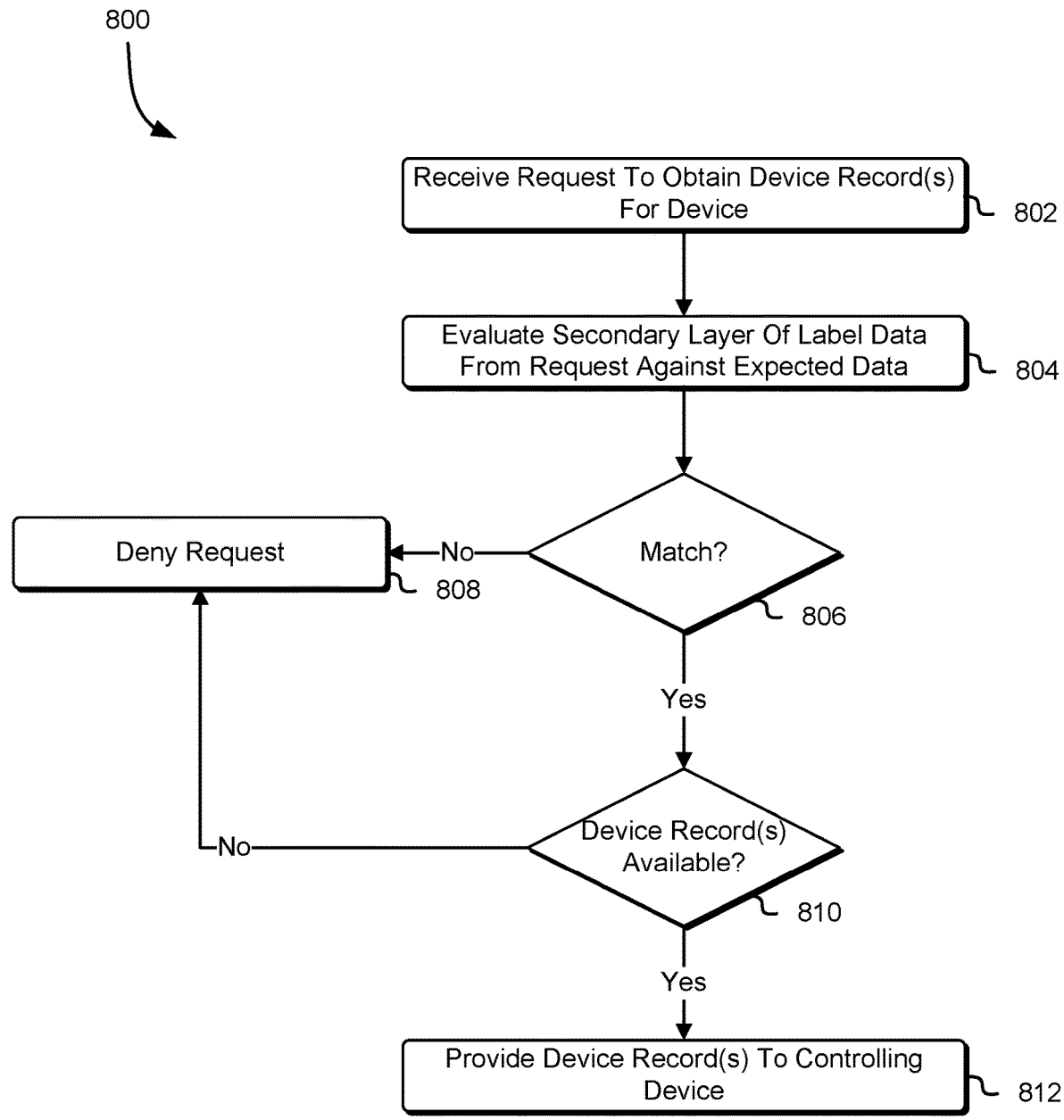
FIG. 8 shows an illustrative example of a process for processing incoming queries to obtain one or more device records for devices in accordance with at least one embodiment.

In an embodiment, the device server associated with the network-connected device receives a request from a controlling device or other device to obtain one or more device records for the network-connected device. The request from the controlling device or other device may specify one or more unique identifiers of the device records that are to be retrieved, as well as information garnered from a scan of the secondary layer of the machine-readable label presented on the network-connected device. If the device server is able to authenticate the request, the device server may obtain the desired device records for the network-connected device and provide these device records to fulfill the request. Accordingly, FIG. 8 shows an illustrative example of a process 800 for processing incoming queries to obtain one or more device records for network-connected devices in accordance with at least one embodiment. The process 800 may be performed by the aforementioned device server, which may include a device records datastore comprising device records for one or more network-connected devices.

As noted above, the user of a controlling device may utilize the controlling device to scan the machine-readable label of a network-connected device to determine whether the machine-readable label includes a secondary layer that includes additional information for the network-connected device. If the machine-readable label includes a secondary layer, the controlling device may use the information specified in this secondary layer of the label to obtain additional device server information for the network-connected device. This additional device server information may include one or more identifiers for device records for the network-connected device. Further, the additional device server information may specify authentication information that may need to be provided to the device server to enable the user of the controlling device to obtain the device records for the network-connected device. The controlling device may utilize the information specified in this secondary layer of the machine-readable label to access the device server for the network-connected device and submit a query to obtain the device records associated with the network-connected device.

The device server may receive 802 the request from the controlling device to obtain one or more device records for the network-connected device. The request may specify one or more unique identifiers of device records that may be stored in the device records datastore of the device server. Further, the request may specify the authentication information necessary for the device server to authenticate the request and to determine whether the user is authorized to access the device records for the network-connected device. The device server may utilize the information provided in the request to evaluate 804 the data purportedly garnered from the secondary layer of the machine-readable label against expected data that would be provided if the information originated from the secondary layer of the machine-readable label. The device server may maintain, within a database, information specified in each machine-readable label prepared for each network-connected device deployed for use.

Based at least in part on the evaluation of the information specified in the received request, the device server may determine 806 whether this information matches the expected data that would be provided if the information originated from the secondary layer of the machine-readable label. If the provided information does not match the expected data from the secondary layer of the machine-readable label, the device server may deny 808 the request. In some embodiments, if the request includes a set of credentials for the user of the controlling device, the device server transmits the set of credentials to an authentication service. The authentication service may evaluate the provided set of credentials using information in a user's profile to determine whether the set of credentials are valid. Further, the authentication service may identify one or more policies associated with the request to determine whether the user is authorized to obtain the device control data from the device server. If the authentication service is unable to authenticate the set of credentials or determines that the user is not authorized to obtain the device control data from the device server, the authentication service may transmit a response to the device server indicating that the request from the controlling device is to be denied. Otherwise, if the set of credentials are successfully authenticated and the user is authorized to obtain the requested device control data for the network-connected device, the authentication service may transmit a response to the device server indicating that the request may be fulfilled.

If the device server determines that the provided information matches the expected data from the secondary layer of the machine-readable label, the device server may determine 810 whether there are any device records for the network-connected device that are available. For instance, if the request specifies one or more unique identifiers for device records of the network-connected device, the device server may query the device records datastore to determine whether there are any device records that correspond to the provided unique identifiers. Alternatively, if the request does not specify these unique identifiers but rather identifies the network-connected device (e.g., serial number, manufacturing date, etc.), the device server may utilize this information to identify any device records that may correspond to the network-connected device.

If the device server is able to locate the one or more device records of the network-connected device, the device server may provide 812 the one or more device records to the controlling device to fulfill the request. This may cause the controlling device to update the GUI presented to users of the controlling device to display a graphical representation for each device record received. In some embodiments, the device server provides additional device control data to the controlling device to enable users of the controlling device to provide state information to the device server for the network-connected device. However, if the device server is unable to identify any device records for the network-connected device, the device server may deny 808 the request and transmit a response to the controlling device to indicate that the requested device records are not available.

Figure 9:
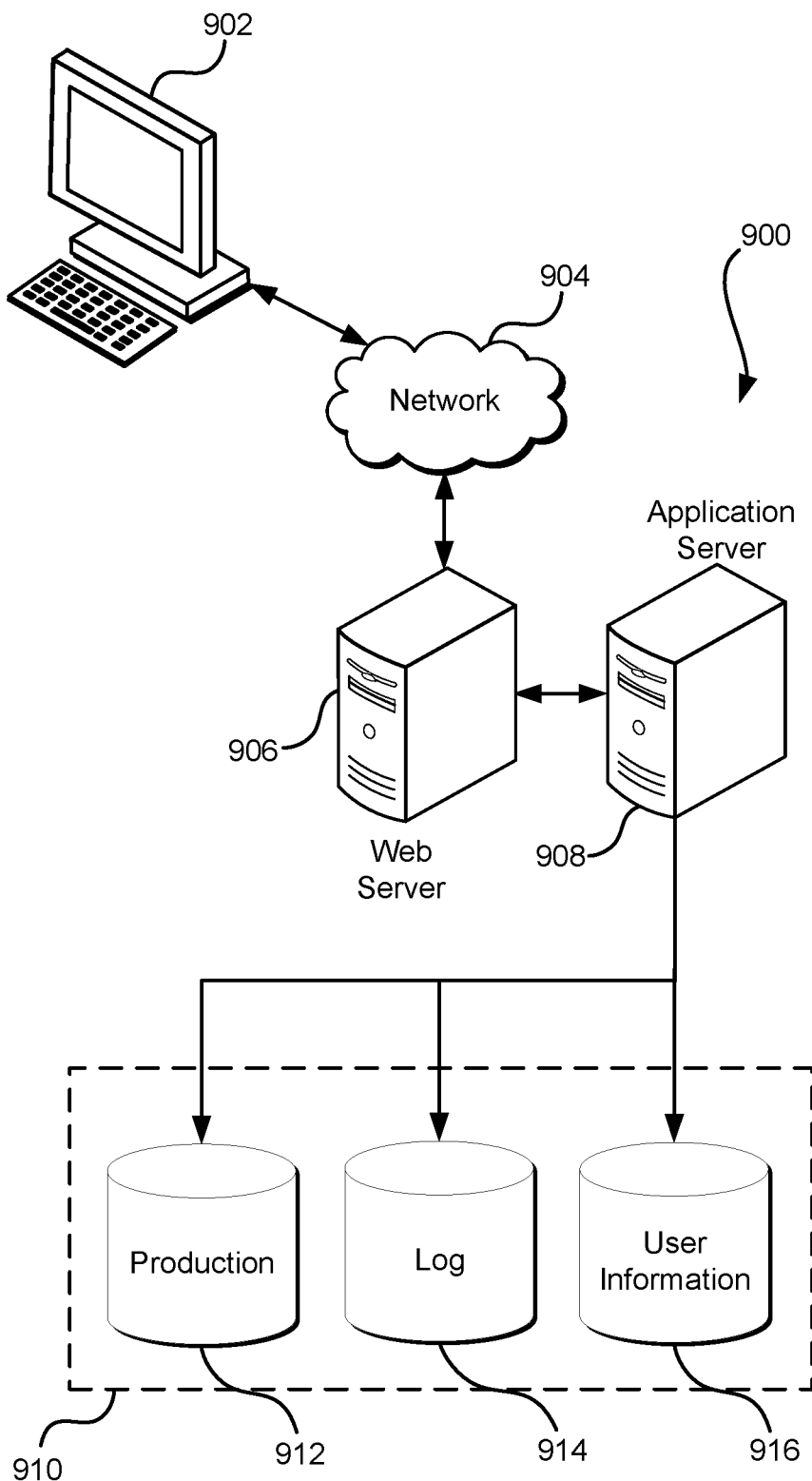
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 902 and the application server 908, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms, and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices, or processing devices, which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
performing a first scan by a first computing device, using a first algorithm, on a machine-readable label of a network-connected device to obtain first information encoded in a first layer of the machine-readable label, the first information specifying information about the network-connected device;
in response to performing the first scan, obtaining a request from a second computing device to provide authentication information, the authentication information to include at least credentials of a user;
providing the authentication information to the second computing device;
obtaining instructions from the second computing device including at least a second algorithm to perform a second scan in response to providing the authentication information;
using the obtained instructions, configuring the first computing device to implement the second algorithm to obtain information encoded differently than the first information encoded in the first layer;
performing the second scan using the second algorithm, wherein the second algorithm is different from the first algorithm, on the machine-readable label of the network-connected device to obtain second information associated with a second layer of the machine-readable label, the second information corresponding to one or more device records of the network-connected device and including information usable to confirm authorization to obtain the one or more device records, the information included in the second information comprising at least image data of the second layer obtained by the first computing device, the second layer being different from the first layer;
transmitting a request to the second computing device associated with the network connected device to obtain, from the second computing device, the one or more device records, the request including the second information; and

29 updating a user interface to enable use of the one or more device records.

2. The computer-implemented method of claim 1, further comprising:
transmitting a second request to the second computing device to obtain, from the second computing device, device control data for the network-connected device, the second request specifying the first information; and
updating the user interface, based at least in part on the device control data, to enable user interaction with the network-connected device through the user interface.

3. The computer-implemented method of claim 1, wherein the one or more device records specify state information for the network-connected device over time, the state information specified by the one or more device records provided by the network-connected device.

4. The computer-implemented method of claim 1, further comprising transmitting a second request to the second computing device to update state information specified in the one or more device records to cause the second computing device to provide the state information to the network-connected device, the second request specifying the second information.

5. A system, comprising:
one or more processors; and
memory including instructions that, if executed by the one or more processors, cause the system to:
perform a first scan, using a first algorithm, on a label of a device to obtain first information from a first layer of the label, the first information specifying information about the device;
provide credential information, based on the first scan, to a device server;
based on the first scan and the credential information, obtain a second algorithm that is different than the first algorithm, the second algorithm obtained from the device server at least in response to authentication, performed by the device server, of the credential information;
perform a second scan, using the second algorithm that is different from the first algorithm, on the label of the device to obtain second information from a second layer of the label, the second layer being different from the first layer, the second information including at least image data of the second layer of the label;
transmit a request to the device server associated with the device to obtain one or more device records for the device, the request including the second information; and
receive the one or more device records based on the second information including at least the image of the second layer of the label.

6. The system of claim 5, wherein the second information corresponds to the one or more device records associated with the device.

7. The system of claim 5, wherein the instructions further cause the system to:
transmit a second request to the device server to obtain control data for the device, the second request including the first information;
receive, from the device server, the control data; and
generate, based at least in part on the control data, a user interface usable to interact with the device.

8. The system of claim 5, wherein the instructions further cause the system to update, in response to receiving the one

30 or more device records, a user interface to enable interaction with the one or more device records through the user interface.

9. The system of claim 5, wherein the instructions further cause the system to transmit a second request to the device server to provide state information for the device, the second request including the second information and the state information usable to update a state of the device.

10. The system of claim 5, wherein the first layer of the label is detectable under a visible light spectrum and the second layer of the label is detectable under a non-visible light spectrum.

11. The system of claim 5, wherein:
the second layer is embedded within the first layer of the label; and
the instructions further cause the system to:
transmit a second request to the device server to obtain second instructions for detecting the second layer, the second request including the first information; and
utilize the second instructions to detect the second layer.

12. The system of claim 5, wherein the second information specifies state information provided by the device to the device server.

13. A non-transitory computer-readable storage medium storing thereon executable instructions that, as a result of being executed by one or more processors of a computer system, cause the computer system to at least:
utilize a sensor of the computer system to obtain image data, the image data encoding a first layer and a second layer, where the first layer is different from the second layer;
utilize a first algorithm to obtain, from the first layer, first information associated with a network-connected device;
provide credential information, based at least on utilizing the first algorithm, to a device server;
in response to utilizing the first algorithm and providing the credential information, obtain a second algorithm usable to obtain information encoded in the second layer, the second algorithm included in instructions obtained from the device server, the instructions causing the computer system to implement the second algorithm;
utilize the second algorithm to obtain, from the second layer, second information associated with the network-connected device, the second algorithm being different from the first algorithm, the second information further specifying authentication information comprising at least the image data of the second layer;
as a result of authenticating, using the authentication information comprising at least the image data of the second layer, query, using the second information, the device server associated with the network-connected device to obtain state information for the network-connected device; and
provide the state information for the network-connected device.

14. The non-transitory computer-readable storage medium of claim 13, wherein the instructions further cause the computer system to:
transmit a request to the device server to obtain the second algorithm, the second algorithm usable to detect the second layer of the image data, the request including the first information.

15. The non-transitory computer-readable storage medium of claim 13, wherein the image data corresponds to a machine-readable label presented on the network-connected device.

16. The non-transitory computer-readable storage medium of claim 13, wherein providing the state information for the network-connected device includes updating a user interface of the computer system to display the state information.

17. The non-transitory computer-readable storage medium of claim 13, wherein the instructions further cause the computer system to transmit a request to device server to update the state information for the network-connected device to cause an update to a state of the network-connected device, the request including the second information.

18. The non-transitory computer-readable storage medium of claim 13, wherein the instructions further cause the computer system to:

transmit a request to the device server to obtain device control data for the network-connected device, the request including the first information;

receive, from the device server, the device control data; and utilize the device control data to update a user interface of the computer system to enable interaction with the network-connected device.

19. The non-transitory computer-readable storage medium of claim 13, wherein the instructions further cause the computer system to:

receive, from the device server, a token usable to obtain the state information for the network-connected device;

transmit a request to the device server to obtain the state information for the network-connected device, the request including the token; and receive, in response to the request, the state information for the network-connected device.

20. The non-transitory computer-readable storage medium of claim 13, wherein the second layer of the image data is a pictographic representation of an object.

\* \* \* \* \*